(12) United States Patent
Lee et al.

(10) Patent No.: US 10,116,132 B2
(45) Date of Patent: Oct. 30, 2018

(54) DEVICE FOR EFFICIENT DIRECT CURRENT INTERRUPTION

(71) Applicant: LSIS CO., LTD, Gyeonggi-do (KR)

(72) Inventors: Gyeong-Ho Lee, Chungcheongbuk-do (KR); Jung-Wook Sim, Sejong-Si (KR); Hae-Yong Park, Chungcheongbuk-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 142 days.

(21) Appl. No.: 14/879,768

(22) Filed: Oct. 9, 2015

(65) Prior Publication Data

US 2016/0105014 A1    Apr. 14, 2016

(30) Foreign Application Priority Data

Oct. 10, 2014  (KR) ........................ 10-2014-0136914

(51) Int. Cl.
*H02H 3/087* (2006.01)
*H01H 33/59* (2006.01)
*H01H 9/54* (2006.01)

(52) U.S. Cl.
CPC .......... *H02H 3/087* (2013.01); *H01H 33/596* (2013.01); *H01H 9/541* (2013.01); *H01H 2009/543* (2013.01)

(58) Field of Classification Search
CPC .......... H02H 3/087; H02H 3/006; H02H 3/08; H02H 1/00; H02H 9/02; H02H 5/04; H01H 33/596; H01H 2009/543; H01H 9/05; H01H 9/54; H01H 33/02; H01H 1/00; H01H 9/542; H01H 9/547; H01H 9/548; H01H 33/59; H01H 9/541; H03K 17/0822; H03K 17/0828; H03K 3/53; H03K 3/537;

(Continued)

(56) References Cited

U.S. PATENT DOCUMENTS 4,459,629 A    7/1984  Titus
4,528,536 A *  7/1985  Blewitt .................. H01H 85/38
                                                            337/158

(Continued)

FOREIGN PATENT DOCUMENTS

DE    1218041 B  *  6/1966  ........... H01H 33/596
EP    2 549 501 A1    1/2013

(Continued)

OTHER PUBLICATIONS

Notice of Allowance dated Sep. 20, 2016 issued in corresponding Japanese Application No. 2015-201414.

(Continued)

*Primary Examiner* — Thienvu Tran
*Assistant Examiner* — Nicolas Bellido
(74) *Attorney, Agent, or Firm* — K&L Gates LLP

(57) ABSTRACT

Disclosed is a direct current (DC) circuit breaker including a first line in which a first high-speed switch and a power semiconductor switch are connected in series; a second line in which a plurality of second high-speed switches, a plurality of pairs of a first non-linear resistor and a power fuse connected in parallel, and a resistor are connected in series; and a third line including a second non-linear resistor. The first line, the second line, and the third line are connected in parallel.

6 Claims, 5 Drawing Sheets

(58) Field of Classification Search
CPC ........... H03F 1/52; H02M 7/06; H02M 5/447; B23K 11/248; H01C 7/13; G05F 1/573
USPC .................. 361/93.1–93.7, 93.9; 307/113
See application file for complete search history.

(56) References Cited

U.S. PATENT DOCUMENTS

| | | | |
|---|---|---|---|
| 2012/0299393 A1* | 11/2012 | Hafner | H01H 9/542 307/113 |
| 2013/0021706 A1 | 1/2013 | Sim et al. | |
| 2013/0278078 A1* | 10/2013 | Ohlsson | H01H 9/548 307/113 |
| 2014/0233140 A1* | 8/2014 | Gaxiola | H02H 3/087 361/67 |
| 2014/0332500 A1* | 11/2014 | Pessina | H01H 33/04 218/4 |
| 2015/0002977 A1* | 1/2015 | Dupraz | H01H 9/542 361/115 |
| 2015/0022928 A1 | 1/2015 | Mohaddes Khorassani | |
| 2016/0197604 A1* | 7/2016 | Iwabuki | H01H 9/541 327/109 |

FOREIGN PATENT DOCUMENTS

| | | | | |
|---|---|---|---|---|
| FR | 2985082 A1 | * | 6/2013 | ............. H01H 9/542 |
| JP | S57-104412 U1 | | 12/1955 | |
| JP | S62-165652 U | | 10/1987 | |
| JP | S63-269428 A | | 11/1988 | |
| JP | H8-315666 A | | 11/1996 | |
| JP | 2015-534235 A | | 11/2015 | |
| KR | 100823848 B1 | | 4/2008 | |
| KR | 1020120089751 A | | 8/2012 | |
| KR | 1020130011817 A | | 1/2013 | |
| KR | 1020140095184 A | | 8/2014 | |
| WO | 2013/093066 A1 | | 6/2013 | |

OTHER PUBLICATIONS

Extended European Search Report in Application No. EP 15186296.8 dated Mar. 23, 2016 in 6 pages.
Office Action in Korean Patent Application 102014-0136914, dated Dec. 30, 2015.

* cited by examiner

PRIOR ART

DEVICE FOR EFFICIENT DIRECT CURRENT INTERRUPTION

CROSS REFERENCE TO RELATED APPLICATION

This application claims the benefit of Korean Patent Application No. 10-2014-0136914, filed on Oct. 10, 2014, entitled "DIRECT CURRENT CIRCUIT BREAKER AND METHOD USING THE SAME", which is hereby incorporated by reference in its entirety into this application

BACKGROUND

1. Technical Field

The present disclosure relates to a direct current (DC) circuit breaker and a method using the same. More specifically, the present disclosure relates to a DC circuit breaker for quickly and efficiently interrupting a high-voltage direct-current (HVDC) system for protecting devices as well as the system at the time of maintenance or replacement of a device, or when a fault-current occurs in a transmission line or a distribution line of the system. The present disclosure also relates to a method using the same.

2. Description of the Related Art

In general, a DC circuit breaker is used for quickly and efficiently interrupting a high-voltage direct-current (HVDC) system for protecting devices as well as the system at the time of maintenance or replacement of a device, or when a fault-current occurs in a transmission line or a distribution line of the system.

Recently, a DC circuit breaker tends to be designed with power semiconductor switches which have a shorter response time and are less likely to damage adjacent lines when a fault occurs. Unfortunately, such a DC circuit breaker employing power semiconductor switches suffers a large electrical current loss, and thus is not appropriate for HVDC transmission. Specifically, a large number of power semiconductor switches, e.g., about tens to hundreds power semiconductor switches are required to conduct HVDC transmission. In addition, such a large number of power semiconductor switches result in electrical current loss.

There has been proposed an approach to improve such shortcoming, which is shown in FIGS. 1 and 2. The approach will be described with reference to FIGS. 1 and 2.

FIG. 1 shows a base element 6 for the solid-state circuit breakers disclosed in the reference. The solid-state circuit breakers are main and auxiliary circuit breakers which will be further described below. The base element 6 includes a power semiconductor switch 1 disposed in a first current direction 4 and a free-wheeling diode 2 connected in anti-parallel to the power semiconductor switch 1.

The base element 6 is used in an example of a device depicted in FIG. 2. A circuit breaker 13 is connected in series with a transmission line 14 as shown in FIG. 2. The transmission line 14 is HVDC transmission line. The circuit breaker 13 includes a main circuit breaker 8 including: tens to hundreds of, depending on a voltage level, the base elements 6 connected in series; a non-linear resistor 11 connected in parallel to the main circuit breaker 8; and a high-speed switch 10 and an auxiliary circuit breaker 9 connected in series, which are connected in parallel to the main circuit breaker 8 and the non-linear resistor 11. The auxiliary circuit breaker 9 includes only one base element 6. Although the high-speed switch 10 is shown as one mechanical switch, which includes at least two mechanical switches that are connected in series and operated simultaneously. A reactor 12 is connected in series to the circuit breaker 13 to limit a current rating.

Operation of the circuit breaker 13 disclosed in the reference is as follows.

During a rated current operation, the high-speed switch 10 is closed as well as the main circuit breaker 8 and the auxiliary circuit breaker 9, so that the rated current flows through the high-speed switch 10 and the auxiliary circuit breaker 9.

When a fault-current is caused by a defect occurring on a line, the auxiliary circuit breaker 9 is opened immediately within a few microseconds after receiving an auxiliary circuit breaker opening signal, causing the fault-current to flow to the main circuit breaker 8. The high speed switch 10 waits for a while to make it sure that the auxiliary circuit breaker 9 is opened, and then is opened. After the opening of the high-speed switch 10 is opened, the main circuit breaker 8 is opened immediately within a few microseconds. When the main circuit breaker 8 is opened, the fault-current is led to flow to the non-linear resistor 11, and then a current level is reduced and a voltage is limited.

However, the main circuit breaker 8 in the reference requires several tens to hundreds of power semiconductor switches connected in series for use in a HVDC system operated in several hundred kV. Since the power semiconductor switches are expensive, manufacturing cost of the DC circuit breaker increase.

SUMMARY

In view of the above, the present disclosure provides a DC circuit breaker which can reduce conduction loss during rated current operation, and can be manufactured at a low cost by configuring a main breaker without employing a power semiconductor, and a method of using the same.

In accordance with an aspect of the present disclosure, there is provided a DC circuit breaker. The DC circuit breaker includes: a first line 20 in which a first high-speed switch 21 and a power semiconductor switch 22 are connected in series; at least one second line 30 in which a plurality of second high-speed switches 31, a plurality of pairs of a first non-linear resistor 32 and a power fuse 33 connected in parallel, and a resistor are connected in series; and a third line 40 including a second non-linear resistor. Further, the first line, the second line, and the third line are connected in parallel.

The second high-speed switches may be disposed in the second line before and after the plurality of pairs, respectively.

The second high-speed switches may have a voltage capacity lower than that of the first high-speed switch.

The power semiconductor switch may be one of an insulated-gate bipolar transistor (IGBT), a metal oxide semiconductor field effect transistor (MOS), an integrated gate-commutated thyristor (IGCT) and a gate turn-off thyristor (GTO).

The DC circuit breaker may further include: a current measuring unit disposed before a parallel connection of the first line, the second line and the third line connected in parallel.

The DC circuit breaker may further include: a fast fault detector which is connected to the current measuring unit and configured to transmit an opening signal to the first high-speed switch and the second high-speed switches, or the power semiconductor switch.

The DC circuit breaker may include a plurality of the second lines configure to be connected in parallel.

A DC circuit breaker may consisting of unit devices connected in series, each of which is one of the DC circuit breakers described above, with the first line, the second line and the third line connected in parallel.

In accordance with another aspect of the disclosure, there is provided a method of using the DC circuit breaker. The method includes: preparing a DC circuit breaker comprising a first line in which a first high-speed switch and a power semiconductor switch are connected in series; a second line in which a plurality of second high-speed switches, a plurality of pairs of a first non-linear resistor and a power fuse connected in parallel, and a resistor are connected in series; and a third line including a second non-linear resistor; opening the first high-speed switch and then turning off the power semiconductor switch after a predetermined time period, such that a current bypasses the first line to flow to the second line; interrupting the current flowing through the second line as the power fuse is melted, such the current flowing through the second line is led to flow to the third line; and reducing the current flowing through the third line by the second non-linear resistor.

The method may further include detecting a fault-current by a current measuring unit after the preparing.

The method may further include transmitting an opening signal to the first high-speed switch, the second high-speed switches and the power semiconductor switch by using a fast fault detector if a fault-current is detected by the current measuring unit.

In order to interrupt a rated current for maintenance of devices while a steady-state current flows, the second high-speed switches may be opened first, and then the first high-speed switch may be opened after a predetermined time period.

With the DC circuit breaker according to the aspect of the present disclosure, manufacturing cost can be reduced by configuring the circuit breaker to include a high-speed switch and a plurality of pairs of a non-linear resistor and a current-limiting power fuse for the purpose of breaking the fault-current.

Further, since the current-limiting power fuse has an advantage in that it has a small size but a large breaking capacity, the DC circuit breaker can be made smaller and lighter and easily maintained.

In the method using the DC circuit breaker according to the another aspect of the present disclosure, the DC circuit breaker may be operated in two different modes: a rated current interruption mode for the purpose of the maintenance and replacement of a device and a fault-current interruption mode when a fault occurs in a line. Therefore, it is possible to avoid replacing a current-limiting power fuse, which frequently occurs in the system when the system is interrupted. As a result, the maintenance cost can be further reduced.

BRIEF DESCRIPTION OF THE DRAWINGS

The above and other aspects, features and advantages of the present disclosure will become apparent from the following description of exemplary embodiments given in conjunction with the accompanying drawings, in which.

DETAILED DESCRIPTION

Hereinafter, preferred exemplary embodiments of the present disclosure will be described with reference to accompanying drawings. The present disclosure will be described in detail to enable those skilled in the art to easily practice the present disclosure. However, the technical idea and scope of the present disclosure is not limited thereto.

DC circuit breakers according to embodiments of the present disclosure will be described in detail with reference to the drawings.

Figure 1:
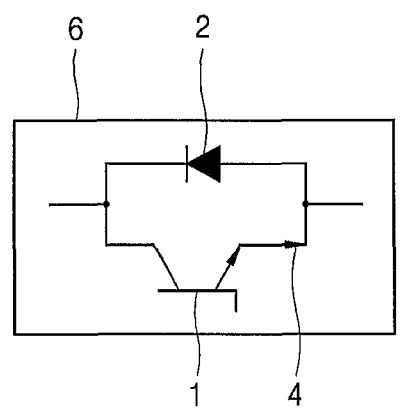
FIG. 1 is a block diagram of elements of a DC circuit breaker according to the prior art.
Figure 2:
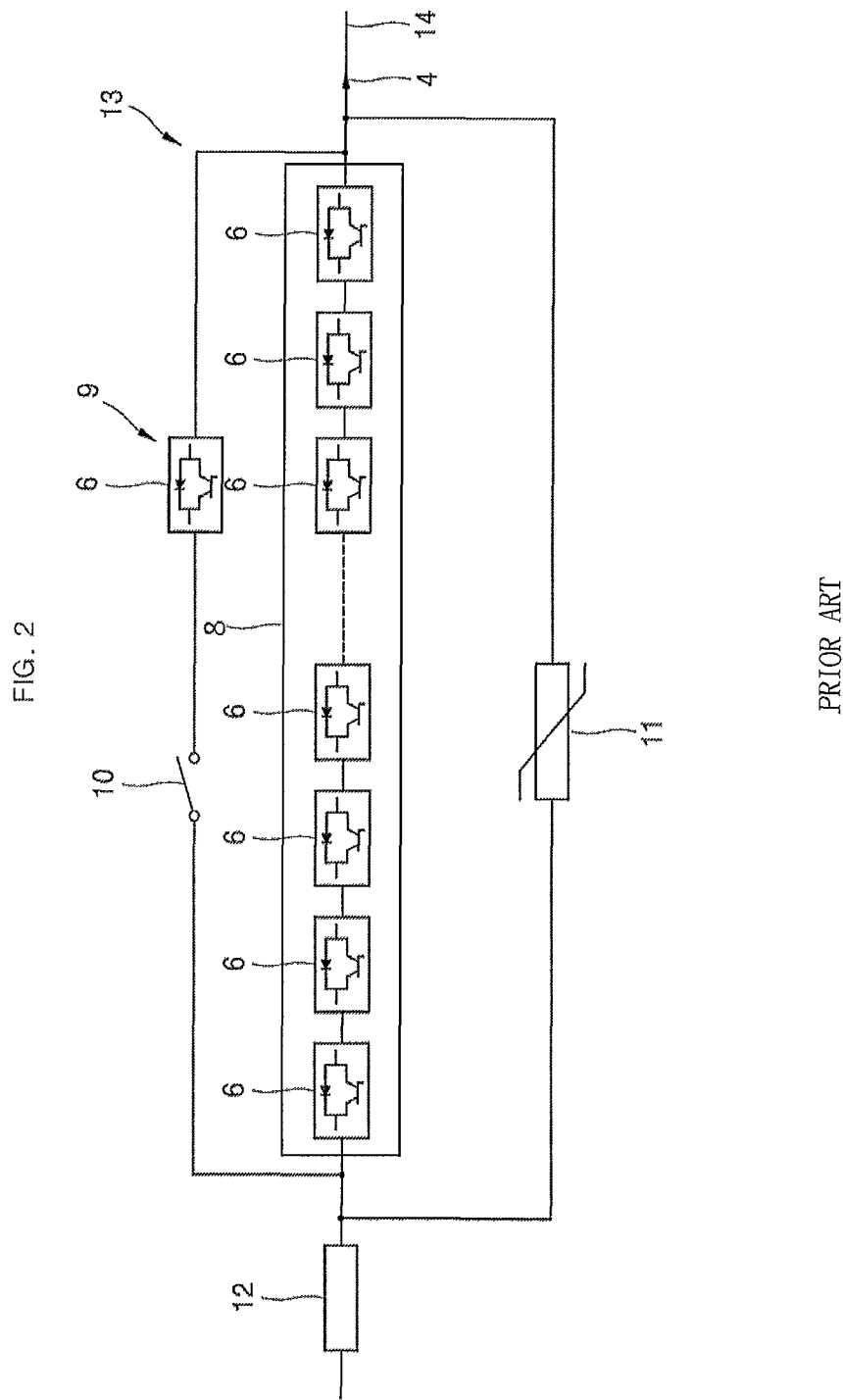
FIG. 2 is a block diagram of a DC circuit breaker according to a prior art.
Figure 3:
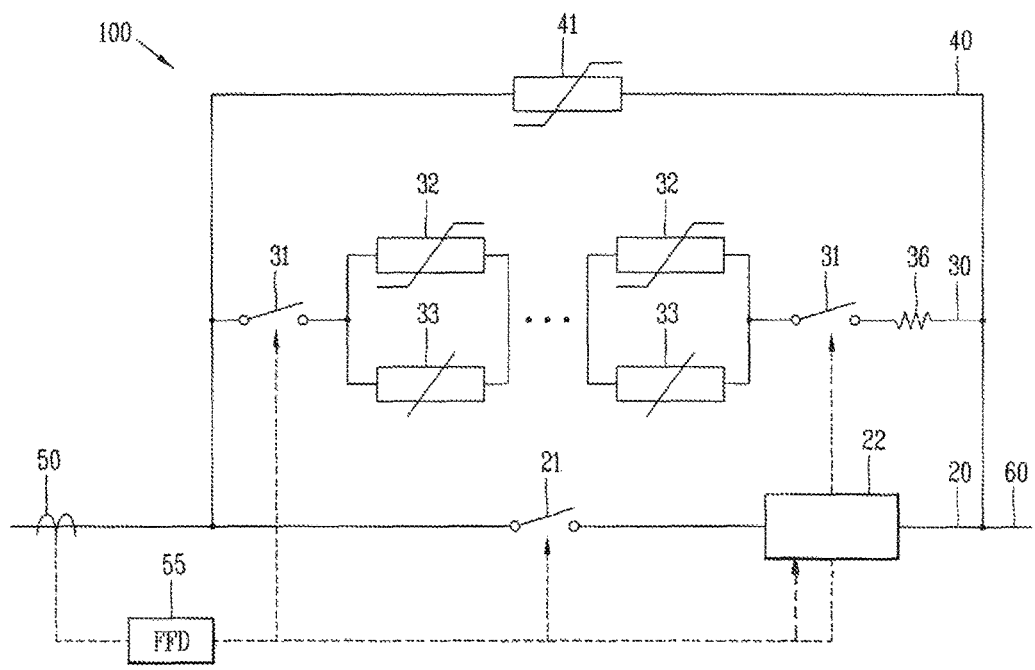
FIG. 3 is a block diagram of a DC circuit breaker according to an embodiment of the present disclosure.

FIG. 3 is a block diagram of a DC circuit breaker according to an embodiment of the present disclosure.

Referring to FIG. 3, the DC circuit breaker includes: a first line 20 in which a high-speed switch 21 and a power semiconductor switch 22 are connected in series; a second line 30 in which a high-speed switches 31, a plurality of pairs of a non-linear resistor 32 and a power fuse 33 connected in parallel, and a resistor 36 are connected in series; and a third line 40 including a non-linear resistor 41. The first line 20, the second line 30, and the third line 40 are connected in parallel to each other.

The first line 20 consists of high speed switch 21 and the power semiconductor switch 22 connected in series. The first line 20 is responsible for conduction of rated current. That is, the first line 20 serves as a main circuit.

The high speed switch 21 is to effectively control a fault-current occurring in a power system and is used to lead a fault-current to flow to another circuit quickly.

The high speed switch 21 includes a vacuum interrupter connected to the main circuit and configured to open and close the main circuit, a contact pressure spring coupled to a movable portion of the vacuum interrupter and providing contact pressure, an insulating rod connected to the contact pressure spring, a permanent magnet actuator connected to the insulating rod and providing a driving force for opening and closing, a drive coil connected to the permanent magnet actuator, a capacitor providing discharge current to the drive coil or a coil portion, and the like. A typical circuit breaker used in an alternating current (AC) power system may be used as the high-speed switch 21. In that case, a gas insulated switchgear, a vacuum circuit breaker, etc. may be used depending on the voltage level applied to the first line 20.

The power semiconductor switch 22 is used for high voltage and large current in power conversion and control. The power semiconductor switch 22 can be configured by using IGBT (Insulated-Gate Bipolar Transistor), MOSFET (Metal Oxide Semiconductor Field Effect Transistor), IGCT (Integrated Gate-Commutated Thyristor), GTO (Gate Turn-off Thyristor) which can perform turn-on and turn off of a current.

The second line 20 consists of the high-speed switches 31, the plurality of pairs of a power fuse 33 and a non-linear resistor 32, and the resistor 36. That is, a power fuse 33 and a non-linear resistor 32 are connected in parallel as a pair, and such pairs are connected in series as multiple stages. When a fault-current occurs, the second line 30 limits and breaks the fault-current. That is, the second line 30 serves as a main breaking circuit.

The power fuse 33 is configured to have a voltage capacity lower than that of the power semiconductor switch 22. The power fuse 33 may be of a current-limiting power fuse. Each of the power fuses 33 in the respective pairs equally divide voltage applied to the direct-current breaker.

An arrestor, for example, may be used as the non-linear resistors 32. The non-linear resistor 32 protects a device against overvoltage applied to the power fuse 33 when an electrical current is interrupted.

A pair of the power fuse 33 and the non-linear resistor 32 connected in parallel constitutes a unit. The number of such units is determined depending on a voltage level of the DC breaker.

The second high-speed switches 31 are disposed before and after the plurality of pairs connected in series, respectively. The high-speed switches 31 provided in the second line 30 may be the same kind of high-speed switches as the high-speed switch 21 disposed in the first line 20. As two high-speed switches 31 are disposed in the second line 30, the high-speed switches 31 only have to cover the half of the voltage covered by the high-speed switch 21. Therefore, the high speed switches 31 disposed in the second line 30 may be configured by a switch having a voltage level lower than that of the high-speed switch 21 disposed in the first line 20.

The resistor 36 is used to control current flowing in the first line 20 and the second line 30. The resistor 36 serves to limit an electrical current when the electrical current is broken. Accordingly, it is possible to adjust a melting time of the power fuse 33.

The non-linear resistor 41 is disposed in the third line 40. The third line 40 serves to finally reduce the fault-current and limit voltage.

A current measuring unit 50 and a fast fault detector (FFD) 55 are disposed at the front end of the circuit to measure a current flowing through transmission and distribution line 60. When a fault-current larger than a predetermined current value occurs, an operation signal is sequentially sent to the high-speed switches 21 and 31 and the power semiconductor switch 22, and then the DC circuit breaker 100 is operated.

The DC circuit breaker according to the embodiment of the present disclosure is disposed in series to the DC transmission and distribution line 60. In a rated current conduction state, the high-speed switches 21 and 31 and the power semiconductor switch 22 are closed. Majority of the rated current flows through the first line 20 in which the high-speed switch 21 and the power semiconductor switch 22 are connected in series. In the rated current conduction state, the difference in amount of current between the first line and the second line is determined by the resistance values of the first line 20 and the second line 30. The amount of the current flowing through the first line 20 can be increased by increasing resistance value of the resistor 36 in the second line 30.

Hereinafter, a method of using the DC circuit breaker 100 in accordance with the embodiment of the present disclosure will be described.

There are two interruption modes in which the DC circuit breaker in accordance with the embodiment of the present disclosure may be operated: an interruption mode in the event that a fault-current occurs, and an interruption mode during a steady-state current conduction state.

First, the interruption mode in the event that a fault-current occurs will be described.

In the event that a fault-current greater than a set current value is measured by the current measuring unit 50, the FFD 55 sends an opening signal to the high-speed switches 21 and 31. The FFD 55 sends an opening signal to the power semiconductor switch 22 when a predetermined time, e.g., several milliseconds (ms), has elapsed after the high speed switches 21 and 31 are opened. Upon receiving the opening signal, the power semiconductor switch 22 completes turn-off operation within a few microseconds ($\mu$m). When the power semiconductor switch 22 is turned off, the fault-current bypasses the first line 20 to flow to the second line 30 and limited by the resistor 36 in the second line 30. After a while, e.g., several milliseconds has elapsed, the power fuse becomes melted by the fault-current, and then the fault-current flowing through the second line 30 is cut-off. As a result, the fault-current is led to flow to the third line 40. Next, fault-current flowing through the third line 40 is reduced by the non-linear resistor 32, and the voltage across the DC circuit breaker 100 is limited.

Next, the interruption mode during the steady-state current conduction state will be described. The interruption mode in the steady-state current conduction state is performed during normal operation, e.g., in the case of operating the DC circuit breaker 100 for repair or replacement of a device installed in the transmission or the distribution line 60. Keep in mind that this interruption mode in the steady-state current conduction state is performed in the rated current conduction state.

When a signal for the interruption mode of the DC circuit breaker 100 is applied from an external device, the high speed switches 31 of the second line 30 is opened at first. Since the current flowing through the second line 30 is merely about in a range of several to several tens of A (ampere), the high speed switches 31 can be broken (opened) in response to a relatively low voltage. When the high speed switches 31 is opened after a time period of a several milliseconds, the high speed switch 21 of the first line 20 is opened. When the high speed switch 21 of the first line 20 is opened after a several milliseconds, the turn-off operation of the power semiconductor switch 22 is started. When the power semiconductor switch 22 is turned off within a several microseconds ($\mu$s), the rated current is led to flow to the third line 40. The rated current flowing through the third line 40 is reduced by the non-linear resistor 32, thereby limiting a voltage drop across the DC circuit breaker 100.

Figure 4:
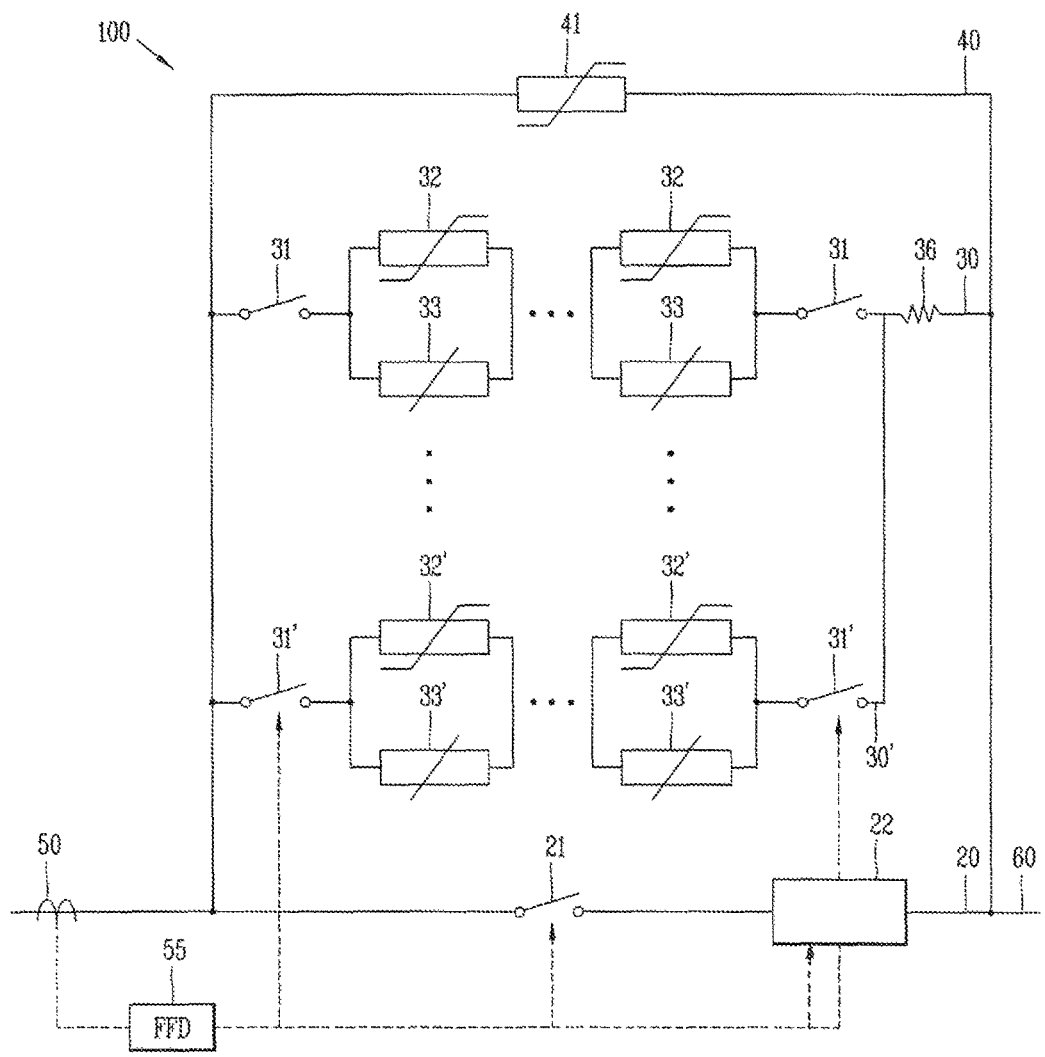
FIG. 4 is a block diagram of a DC circuit breaker according to another embodiment of the present disclosure.

Hereinafter, a DC circuit breaker 101 in accordance with another embodiment of the present disclosure will be described with reference to FIG. 4.

In this embodiment, a plurality of the second lines 30 connected is disposed in parallel. As can be seen from the circuit shown, a plurality of circuit elements, except for the resistor 36, may be disposed in parallel to another plurality of circuit elements.

In the normal state, only one of the second lines 30 is connected (closed). When the second line is opened due to an interruption operation, another second line 30' is connected (closed) after a detouring of the fault-current is completed. Afterwards, when the second line 30' currently connected is opened due to the occurrence of the fault-current, another second line is closed. In this manner, multiple alternative lines are disposed to earn the time required to replace the power fuse 33.

Figure 5:
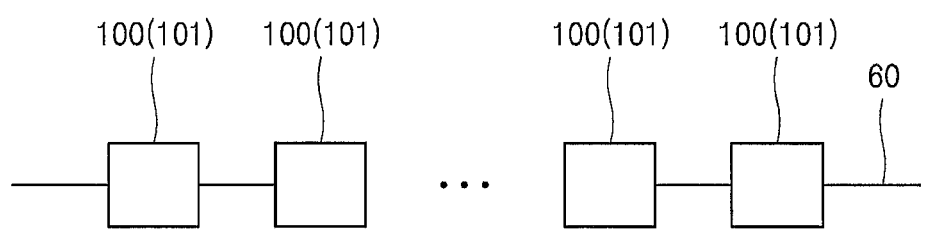
FIG. 5 is a block diagram of a DC circuit breaker according to still another embodiment of the present disclosure.

A DC circuit breaker in accordance with still another embodiment of the present disclosure will be described with reference to FIG. 5.

In this embodiment, the configuration of any of the above embodiments (a single device in which the first line 20, the second line 30 and the third line 40 are connected in parallel) is connected to another in series. By doing so, this makes it possible to obtain a higher breaking capability in dealing with a power transmission or distribution line having a higher voltage.

According to an embodiment of the present disclosure, a DC circuit breaker includes a breaking unit consisting of a plurality of pairs of a high-speed switch and a current-limiting power fuse connected in parallel. In this configuration, the manufacturing cost can be reduced.

Further, since the current-limiting power fuse has an advantage in that it has a small size but a large breaking capacity, the DC circuit breaker can be made smaller and lighter and easily maintained.

According to an embodiment of the present disclosure, there is provided a method using the DC circuit breaker, in which the DC circuit breaker may be operated in two different modes: the rated current interruption mode for the purpose of the maintenance and replacement of a device and the fault-current interruption mode when a fault occurs in a line. Therefore, it is possible to avoid replacing a current-limiting power fuse, which frequently occurs in the system when the system is interrupted. As a result, the maintenance cost can be further reduced.

While the present disclosure has been illustrated and described with respect to the embodiments, it is to be understood by those skilled in the art that various alterations and modifications may be made without departing from the scope of the present disclosure. It is obvious that those alterations and modifications are all fall within the scope of the present disclosure defined only by the appended claims.

For example, according to the embodiment of the present disclosure, the resistor is connected in series to the second line. However, according to another embodiment, a DC circuit breaker may include: a first line having a power semiconductor switch for conducting a rated current; a second line connected in parallel to the first line, in which pairs of a non-linear resistor and a power fuse connected in parallel are connected in series as multiple stages to limit and break a fault-current in case of occurrence of the fault-current; a third line connected in parallel to the first line and having a non-linear resistor for reducing a detoured fault-current or a rated current and limiting a voltage; and a fast fault detector configured to output a switching control signal to high-speed switches disposed in the first line and the second line, respectively, in a predetermined setting order for use in each of a fault-current interruption mode and a steady-state current interruption mode.

Similarly, according to another embodiment, there may be provided a method of using the DC circuit breaker, which includes preparing a first line having a power semiconductor switch for conducting the rated current; preparing a second line connected in parallel to the first line, in which pairs of a non-linear resistor and a power fuse connected in parallel are connected in series as multiple stages to limit and break a fault-current in case of occurrence of the fault-current; preparing the third line connected in parallel to the first line and having a non-linear resistor for reducing a detoured fault-current or a rated current and limiting a voltage; and outputting the switching control signal to high-speed switches disposed in the first line and the second line, respectively, in a predetermined setting order for use in each of a fault-current interruption mode and a steady-state current interruption mode.

What is claimed is:

1. A direct current (DC) circuit breaker comprising:
a first line in which a first high-speed switch and a power semiconductor switch are connected in series;
at least one second line, each of the at least one second line including a plurality of second high-speed switches, a plurality of pairs and a resistor which are connected in series, each of the pairs including a first non-linear resistor and a power fuse connected in parallel with the first non-linear resistor;
a third line including a second non-linear resistor;
a current measuring unit disposed before the first line, the second line, and the third line which are connected in parallel; and
a fast fault detector (FFD) connected to the current measuring unit and configured to transmit an opening signal to the first high-speed switch and the second high-speed switches and the power semiconductor switch,
wherein at least one of the plurality of second high-speed switches are disposed in one end of the pairs, and the other at least one of the plurality of second high-speed switches are disposed in the other end of the pairs,
wherein, in a fault-current interruption mode, the fast fault detector is configured to output a switching control signal such that the first high-speed switch and the second high-speed switch are opened first, and then the power semiconductor switch is opened after a first predetermined time period, and
wherein, when the power semiconductor switch is opened and a second predetermined time period has elapsed, a fault-current is directed to flow to the third line.

2. The DC circuit breaker of claim 1, wherein the second high-speed switches have a voltage capacity lower than that of the first high-speed switch.

3. The DC circuit breaker of claim 1, wherein the power semiconductor switch is one of an insulated-gate bipolar transistor (IGBT), and a metal oxide semiconductor field effect transistor (MOSFET), an integrated gate-commutated thyristor (IGCT) and a gate turn-off thyristor (GTO).

4. The DC circuit breaker of claim 1,
wherein, in a steady-state current interruption mode, the fast fault detector is configured to output the switching control signal such that the second high-speed switches are opened first, the first high-speed switch is opened after a third predetermined time period, and a turn-off operation of the power semiconductor switch is started after a fourth predetermined time period,
wherein, when the power semiconductor switch is turned off, a rated current is directed to flow to the third line.

5. The DC circuit breaker of claim 1, wherein the at least one second line comprises a plurality of second lines connected in parallel.

6. The DC circuit breaker consisting of unit devices connected in series, wherein each of the unit devices is the DC circuit breaker of claim 1, with the first line, the at least one second line and the third line connected in parallel.

* * * * *

UNITED STATES PATENT AND TRADEMARK OFFICE
CERTIFICATE OF CORRECTION

PATENT NO. : 10,116,132 B2  
APPLICATION NO. : 14/879768  
DATED : October 30, 2018  
INVENTOR(S) : Gyeong-Ho Lee et al.

Page 1 of 1

It is certified that error appears in the above-identified patent and that said Letters Patent is hereby corrected as shown below:

On the Title Page

Item (54) and in the Specification, Column 1 Lines 1-2, the Title reading "DEVICE FOR EFFICIENT DIRECT CURRENT INTERRUPTION" should be changed to "DEVICE AND METHOD FOR EFFICIENT DIRECT CURRENT INTERRUPTION"

Signed and Sealed this  
Eighth Day of January, 2019

Andrei Iancu  
*Director of the United States Patent and Trademark Office*